United States Patent [19]

Contursi et al.

[11] Patent Number: 5,151,260
[45] Date of Patent: Sep. 29, 1992

[54] PROCESS FOR PREPARING FINE POWDERS OF ALUMINUM NITRIDE

[75] Inventors: Luigi Contursi, Lugo; Leandro Beaulardi, Imola, both of Italy

[73] Assignee: Temay S.p.A., Venice, Italy

[21] Appl. No.: 629,997

[22] Filed: Dec. 19, 1990

[30] Foreign Application Priority Data

Dec. 21, 1989 [IT] Italy .............................. 22793 A/89

[51] Int. Cl.$^5$ .......................................... C01B 21/072
[52] U.S. Cl. ..................................................... 423/412
[58] Field of Search ................................. 423/412, 625

[56] References Cited

U.S. PATENT DOCUMENTS

| | | | |
|---|---|---|---|
| 2,137,638 | 11/1938 | Sondern et al. | 423/625 |
| 3,114,720 | 12/1963 | Nixon | 423/625 |
| 4,780,299 | 10/1988 | Kumagai et al. | 423/412 |
| 4,929,433 | 5/1990 | Hexemer, Jr. et al. | 423/412 |
| 4,985,225 | 1/1991 | Hashimoto et al. | 423/412 |

FOREIGN PATENT DOCUMENTS

| | | | |
|---|---|---|---|
| 15946 | 2/1980 | Japan | 423/412 |
| 6105 | 1/1986 | Japan | 423/412 |
| 56309 | 3/1989 | Japan | 423/412 |

OTHER PUBLICATIONS

David A. Copson *Microwave Heating*, Chapter 17, pp. 371-373, The Avi Publishing Co., Inc. (1962).

*Primary Examiner*—Wayne Langel
*Attorney, Agent, or Firm*—George P. Hoare, Jr.

[57] ABSTRACT

Disclosed is a process for preparing fine powders of aluminum nitride, by starting from an aqueous solution of an inorganic aluminum salt, characterized in that said process comprises the following steps:

(a) the anion of the inorganic salt of aluminum is at least partially removed by heating, with a colloidal solution of an aluminum compound being obtained;

(b) carbon powder is dispersed in said colloidal solution, with a suspension of an aluminum compound and carbon being obtained;

(c) said suspension is mixed with a carbohydrate, with a suspension being obtained of an aluminum compound and carbon in a solution which contains the carbohydrate;

(d) the suspension obtained from the (c) step is sprayed onto, or dropwise added to, an alkaline solution, with spherical bodies being obtained, which contain aluminum hydroxide and carbon;

(e) said spherical bodies are carbothermally reduced and nitrided at a temperature comprised within the range of from 1350° to 1650° C. for a time comprised within the range of from 1 to 24 hours, so that powders containing aluminum nitride are obtained;

(f) carbon is removed from said powders by a calcination carried out at a temperature comprised within the range of from 600° to 700° C., for a time comprised within the range of from 1 to 7 hours, under an oxygen-containing atmosphere.

6 Claims, No Drawings

PROCESS FOR PREPARING FINE POWDERS OF ALUMINUM NITRIDE

The present invention relates to a process for preparing fine powders of aluminum nitride.

Aluminum nitride (AlN) shows a good chemical stability and a high heat conductivity.

These characteristics make it suitable for use as a functional ceramic material (i.e., as a support for electronic circuits) and as a structural ceramic material (i.e., for components exposed to high temperatures and/or aggressive media).

The starting material to prepare ceramic components made from AlN is AlN powder, which is suitably fabricated and sintered.

The characteristics of the sintered bodies depend on the purity of AlN powder and on the size of its particles.

Several routes are available to produce said powder:
direct synthesis from Al metal and $N_2$;
nitriding in the gas phase of a volatile compound of Al with $N_2$ and/or $NH_3$;
carbothermal reduction and nitriding of a mixture of $Al_2O_3$ and C at temperatures comprised within the range of from 1600° to 1900° C., and under a nitrogen atmosphere.

The first method (i.e., the direct synthesis) allows an only incomplete formation of Al nitride to be obtained. The second method (i.e., the nitriding in the gas phase) suffers from the disadvantage that the production cost is high. The disadvantages of both said methods can be at least partially reduced by using the last method.

By techniques of preparation of the mixture of $Al_2O_3+C$ by a chemical route, an improvement is achieved in said method, which makes it possible purer and smaller-particle-size AlN powders to be obtained, even if the process is carried out at some hundred degrees lower operating temperatures. The purpose of such techniques is of having both reactants as particles of sub-micron particle size and intimately dispersed inside each other.

An example of a chemical method recently adopted to prepare the mixture of $Al_2O_3$ and C is based on the hydrolysis and precipitation with ammonia of an aluminum alkoxide (aluminum isopropoxide) in alcoholic suspension in which carbon powder was previously dispersed (see U.S. Pat. No. 4,643,859).

The present Applicant has found now a process based on a different chemical method to obtain the mixture of $Al_2O_3$ and C, which is much simpler than the process according to the above cited United States patent, which also enables very pure AlN powders constituted by particles with a very small particle size to be obtained.

The process according to the present invention for preparing fine powders of aluminum nitride, by starting from an aqueous solution of an inorganic aluminum salt, is characterized in that said process comprises the following steps:
(a) the anion of the inorganic salt of aluminum is at least partially removed by heating, with a colloidal solution of an aluminum compound being obtained;
(b) carbon powder is dispersed in said colloidal solution, with a suspension of an aluminum compound and carbon being obtained;
(c) said suspension is mixed with a carbohydrate possibly in solution, with a suspension being obtained of an aluminum compound and carbon in a solution which contains the carbohydrate;
(d) the suspension obtained from the (c) step is sprayed onto, or dropwise added to, an alkaline solution (e.g., an ammonium hydroxide solution), with spherical bodies being obtained, which contain aluminum hydroxide and carbon;
(e) said spherical bodies are carbothermally reduced and nitrided at a temperature comprised within the range of from 1350° to 1650° C. for a time comprised within the range of from 1 to 24 hours, so that powders containing aluminum nitride are obtained;
(f) carbon is removed from said powders by a calcination step carried out at a temperature comprised within the range of from 600° to 700° C., for a time comprised within the range of from 1 to 7 hours, under an oxygen-containing atmosphere.

The carbohydrate may be, e.g., a polysaccharide, in particular methyl-cellulose.

The carbon powder which is dispersed throughout the colloidal solution should preferably consist of particles having a particle size smaller than 40 nm.

Furthermore, the atomic ratio of Al/C in the formed suspension should preferably be comprised within the range of from 2:3 to 2:5.

As regards the size of the spherical bodies, it depends on the size of the drops: when the suspension is sprayed, e.g., by a revolving cone, spherical bodies of 100 micrometers of size or even smaller are produced; whereas by dropwise addition, about 10-fold larger bodies are obtained.

The heating of the aqueous solution of the inorganic aluminum salt can be preferably carried out in a microwave oven.

Some examples are now given to better illustrate the invention. In no way should the following examples be construed as being limitative of the same invention.

EXAMPLE 1

A solution of 100 g of $Al(NO_3)_3.9H_2O$ in 100 cm$^3$ of distilled water is de-nitrated in a 1400-W microwave oven at 80% power, during a time of 15 minutes. The resulting residue, which contains about 30% of the initial nitrate, is dispersed in $H_2O$ at 80°–90° C., with stirring, until a practically clear solution is obtained. After cooling, carbon powder is dispersed in such an amount as to yield an atomic ratio of Al/C=0.45 (surface area and size of carbon particles respectively=100 m$^2$/g and 20–30 nm).

The dispersion of carbon is accomplished by mechanical stirring and subsequent sonication for 15 minutes. The suspension is subsequently admixed with a solution at 3.5% of methyl-cellulose (20 cm$^3$); and finally the volume is adjusted at 110 cm$^3$ with $H_2O$.

The colloidal suspension is sprayed by a revolving cone (at about 2500 rpm) in 7M solution of ammonium hydroxide.

After a 2-hour ageing in the ammonium hydroxide solution, the so obtained spherical bodies are washed with $H_2O$ and dried in air at 150° C. for 2 hours.

The spherical bodies (of about 100 micrometers of diameter) are transferred to an alumina tray, then are charged to a furnace at 1500° C. and are kept under these conditions for a 3-hour time, under a flowing nitrogen stream.

After removing the excess carbon by oxidation in air at 650° C. for 6 hours, the analysis of the powder by X-ray diffraction (R×D) showed that said powder was constituted by one single crystal phase, corresponding to AlN. The chemical analysis showed that the product was 91% AlN.

EXAMPLE 2

A sample of spherical bodies prepared as in Example 1 was treated at 1550° C. for 6 hours under a nitrogen flow. After a 6-hour calcination in air at 650° C., the analysis by R×D showed that the powder was constituted by one single crystal phase corresponding to AlN. The chemical analysis showed that the obtained product was 95%.

EXAMPLE 3

100 ml of the suspension disclosed in Example 1 was dropwise added to the ammonium hydroxide solution through a needle of 0.5 mm: the resulting spherical bodies, after ageing in the same ammonium hydroxide solution, water washing and air drying at 150° C. for 2 hours, had a diameter of approximately 1 mm.

A sample of said spherical bodies was submitted to a 6-hour long treatment at 1550° C. under a nitrogen flow. After a 6-hour calcination in air at 650°, the sample was shown to contain 97% of AlN.

(COMPARATIVE) EXAMPLE 4

25 g of $Al(OH)_3$ powder is dispersed in 100 $cm^3$ of $H_2O$ by a 15-minute sonication, until a practically clear solution is obtained. To said solution, 6.7 g of carbon powder is added (atomic Al/C ratio=2:3.5) first with mechanical stirring and then with sonication. Due to thixotropy, a gel-like mass is obtained after about 2 minutes. After a 2-hour drying at 150° C., the mixture of hydrous Al oxide and C is charged to the furnace and is kept 4 hours at 1500° C. under a flowing $N_2$ atmosphere.

Carbon is then removed by a 6-hour calcination in air at 650° C. The resulting powder is constituted by 59% AlN.

(COMPARATIVE) EXAMPLE 5

10 g of gamma-$Al_2O_3$ is dispersed in 50 $cm^3$ of $H_2O$ by ultrasound-stirring until a practically clear solution is obtained. To said solution, 4.12 g of carbon powder is added (atomic Al/C ratio=2:3.5) first with mechanical stirring and then with sonication. Due to thixotropy, a gel-like mass is obtained after about 1 minute.

The drying is carried out by a 2-hour heating at 150° C. in air. The mixture of $Al_2O_3$ and C is charged to the furnace and is submitted to a 4-hour treatment at 1500° C. under a stream of flowing $N_2$.

The residual carbon is then removed by a 6-hour calcination in air at 650° C. 73% of the resulting powder is constituted by AlN.

We claim:

1. Process for preparing fine powders of aluminum nitride, by starting from an aqueous solution of an inorganic aluminum salt, wherein said process comprises:
   (a) removing the anion of the inorganic aluminum salt at least partially by heating, with a colloidal solution of an aluminum compound being obtained;
   (b) dispersing carbon powder in said colloidal solution, with a suspension of an aluminum compound and carbon being obtained;
   (c) mixing said suspension with a carbohydrate, with a suspension being obtained of an aluminum compound and carbon in a solution which contains the carbohydrate;
   (d) adding the suspension obtained from the (c) step to an alkaline solution, with spherical bodies being obtained which contain aluminum hydroxide and carbon;
   (e) reducing and nitriding said spherical bodies carbothermally at a temperature of from 1350° to 1650° C. for a time of from 1 to 24 hours, so that powders containing aluminum nitride are obtained; and
   (f) removing carbon from said powders by a calcination step carried out at a temperature of from 600° to 700° C., for a time of from 1 to 7 hours, under an oxygen-containing atmosphere.

2. Process according to claim 1, in which the carbohydrate to be mixed with the suspension in the (c) step is added in solution.

3. Process according to claim 1, in which the carbohydrate is a polysaccharide.

4. Process according to claim 3, in which the polysaccharide is methyl-cellulose.

5. Process according to claim 1, in which the carbon powder dispersed in the colloidal solution is comprised of particles having a particle size smaller than 40 nm.

6. Process according to claim 1, in which the heating in the (a) step is carried out in a microwave oven.

* * * * *

UNITED STATES PATENT AND TRADEMARK OFFICE
CERTIFICATE OF CORRECTION

PATENT NO. : 5,151,260
DATED : September 29, 1992
INVENTOR(S) : Luigi Contursi, Leandro Beaulardi It is certified that error appears in the above-identified patent and that said Letters Patent is hereby corrected as shown below:

On the Title page, item [73], the Assignee should read as -- Temav, S.p.A. --.

Signed and Sealed this

Twenty-eighth Day of September, 1993

*Attest:*

BRUCE LEHMAN

*Attesting Officer*     *Commissioner of Patents and Trademarks*